United States Patent Office 3,168,324
Patented Feb. 2, 1965

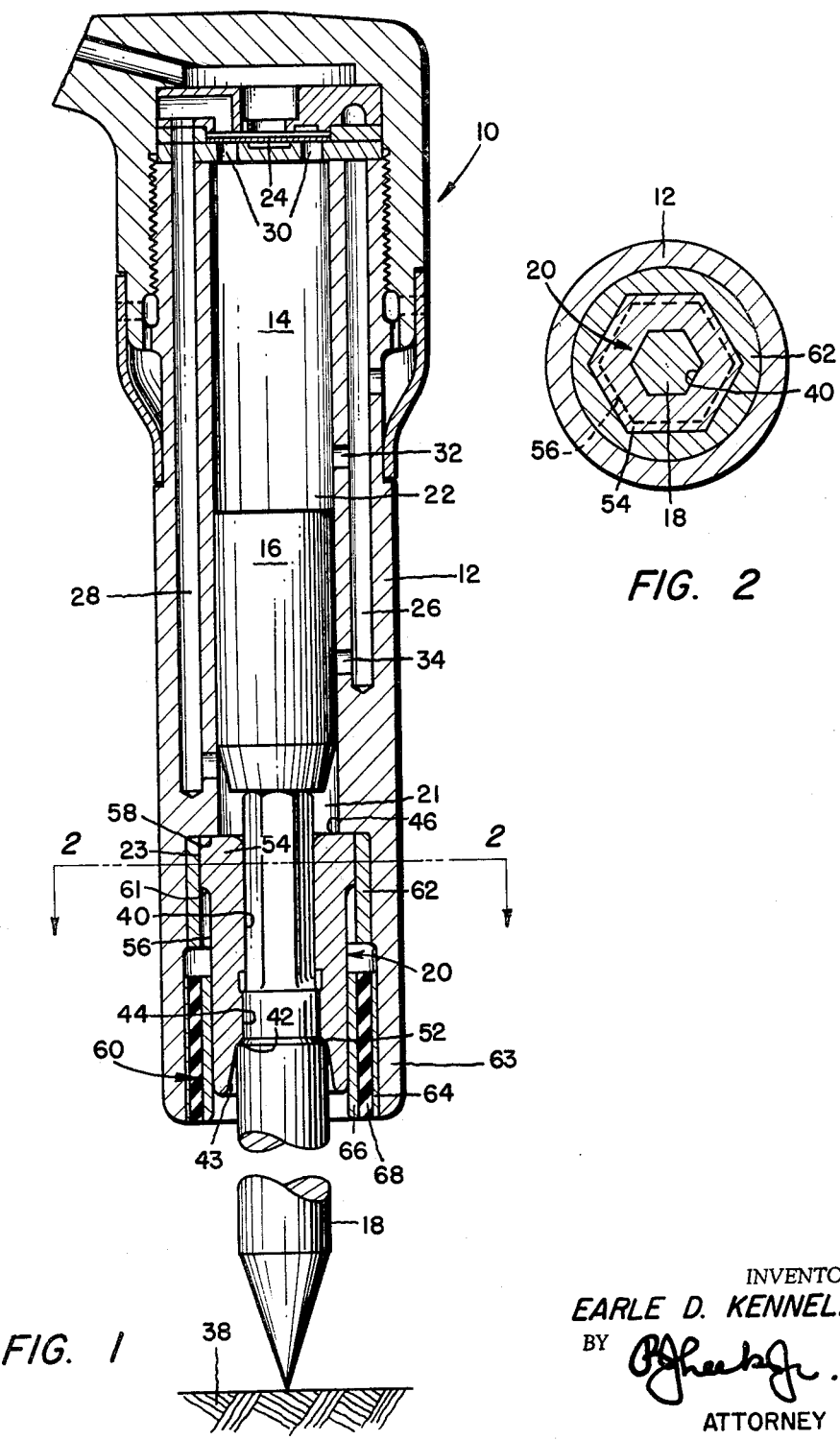

3,168,324
CHUCK
Earle D. Kennell, Wilawana, Pa., assignor to Ingersoll-Rand Company, New York, N.Y., a corporation of New Jersey
Filed Feb. 15, 1963, Ser. No. 258,774
4 Claims. (Cl. 279—19.7)

This invention relates to a pneumatic tool, and more particularly to a chuck for pneumatic tools.

Heretofore it has been known in the art of pneumatic tools that during the operation or during the use of pneumatic tools, vibrations are set up which are detrimental to the object being operated upon, as well as deleterious to the health of the operators themselves. The vibrations of the tool would lead to difficulty in handling the tool as well as errors during the performance of the desired operation.

It is the general object of the present invention to avoid and overcome the foregoing and other difficulties of and objections to prior art practices by providing an inexpensive and well constructed chuck for a pneumatic tool.

Another object of this invention is to provide a chuck that will reduce to a minimum the vibration of a pneumatic tool.

A further object of this invention is to provide a cushioning means adapted to limit the movement of such chuck in the forward direction toward the work.

The aforesaid objects of the present invention, and other objects which will become apparent as the description proceeds, are achieved by providing a pneumatic tool having a chamber for a hammer which hammer is reciprocated by fluid under pressure to actuate a working element. The chuck is slidably mounted in one end of the tool and has a bore adapted to receive the working element, with means on the chuck to limit the rearward movement of the working element in the chuck. In addition, the chuck has a surface subjected to fluid pressure in the said one end of the chamber.

For a better understanding of the present invention reference should be had to the accompanying drawings, wherein like numerals of reference indicate similar parts throughout the several views and wherein:

FIGURE 1 is a fragmentary vertical sectional view of a pneumatic tool embodying a preferred form of the invention and with its hammer in the striking position.

FIGURE 2 is an enlarged horizontal sectional view taken along the line 2—2 of FIGURE 1 in the direction of the arrows.

Although the principles of the present invention are broadly applicable to the limitation of vibration in all types of tools, the present invention is particularly adapted to use in conjunction with pneumatic tools and hence has been so illustrated and will be so described.

With specific reference to the form of the present invention illustrated in the drawings and referring particularly to FIGURE 1 a pneumatic tool, such as a chipping hammer, is indicated generally by the reference numeral 10, the tool having a casing 12. Within the casing 12 there is provided a hammer chamber 14 within which a fluid actuated means such as hammer 16 is disposed. The hammer or piston 16 may reciprocate within the hammer chamber 14 to actuate a working element 18 such as a chipping tool, the working element 18 thereby being able to deliver rapid and repeated blows to a work piece 38. Structurally, the working element or tool bit 18 must be guided within the casing 12 during the operation of the pneumatic tool 10. The manner in which the working element is retained in the tool is well known to those skilled in the art, and per se forms no part of the invention. In order to provide this guiding feature a chuck 20 is slidably mounted within the casing 12.

The hammer 16 is reciprocated in the hammer chamber 14 in a manner well known to those skilled in the art, as by alternately supplying and exhausting fluid under pressure to and from the front end portion 21 and the back end portion 22 of the chamber 14. As herein above stated, the manner of reciprocating the hammer 16 within the chamber 14 is well known to those skilled in the art, and forms no part of this invention.

In order to supply fluid under pressure to the hammer chamber 14, an oscillating type valve 24 is mounted at the back end 22 of the hammer chamber 14, the fluid, such as air, being under pressure and alternately delivered to the front end 21 of the hammer chamber 14 through longitudinal passageway 28 in casing 12 and to the back end portion 22 of the hammer chamber 14 through ports 30 in the portion 22. Exhaust ports 32 and 34 in the casing 12 are provided so that the front end portion 21 and back end portion 22 of the hammer chamber 14 may be exhausted alternately during the reciprocation of the hammer 16. A longitudinal passage 26 is provided in the casing 12 and communicates with exhaust ports 32 and 34 to convey the exhausted fluid from the hammer chamber 14.

In pneumatic tools of this type the hammer 16 reciprocates at a high frequency and the tool 10 is normally held very loosely in the operator's hand. As a consequence, during the period the hammer 16 actuates the working element 18 and immediately thereafter, the working element 18 (after striking the work piece 38) rebounds therefrom, tending to cause the working element 18 to chatter or vibrate in the casing 12. The improved chuck 20 of the present invention corrects the vibrational defect heretofore encountered in conventional tools.

Chuck

The improved chuck 20 of the present invention reduces these vibrations to a minimum by exerting a force in the forward direction on the working element 18 and thereby limits its rebound from the work piece 38. In order for the chuck 20 to exert such a force there is provided at the rear end 23 of the chuck 20 a surface 46 which is subjected to fluid pressure from the front end portion 21 of the chamber 14. The fluid pressure in the front end portion 21 of the hammer chamber 14 is of such a magnitude that when acting upon such chuck surface 46, it will move the chuck 20 into engagement with the working element 18 and limit the rebound of the working element 18 from the work piece 38.

It is apparent that different size tools will require a different pressure and therefore it should be remembered that the larger the chuck area 46 subjected to fluid pressure from the hammer chamber 14, the less pressure in the front end 21 is required to perform the limiting operation. Conversely, the smaller the area of the surface 46 of the chuck 20 exposed within the hammer chamber 14, the greater the pressure in the front end portion 21 which is required to limit the movement of the chuck 20. At times other than the above mentioned periods, the working element 18 will not vibrate to any appreciable extent.

Referring now to the details of the invention, the chuck 20 is provided with a bore 40 extending therethrough to receive the reciprocable working element 18 and the hereinbefore mentioned surface 46 on the rear end portion 23 of the chuck 20. The back portion 23 of the chuck 20 having the surface 46 defines the forward end of the hammer chamber 14 and therefore is exposed to the pressure in the front end portion 21 of hammer chamber 14. In order to facilitate the receiving of the working element 18 in the bore 40, the bore 40 is provided at its forward end 44 with a flared portion 43. The shank of the working element 18 extends through the bore 40 into the front end portion 21 of the hammer chamber 14 and receives the blows from the hammer 16. To limit the rearward movement of the working element 18, a shoulder 42 is provided on the forward end 44 of the bore 40 and cooperates with a shoulder 52 on the working element 18. This cooperation results in a limitation on the rearward movement of the working element 18 in the chuck 20, for when shoulder 42 in the bore 40 is engaged by the shoulder 52 on the working element 18, this engagement stops the rearward movement of the working element 18.

With the hammer 16 in position as shown in FIGURE 1, that is in the striking position, the hammer 16 actuates the working element 18. Immediately thereafter, the fluid under pressure in the front end portion 21 of the hammer chamber 14 exerts a force on the rear chuck surface 46, which force urges the chuck 20 in the forward direction toward the bottom of FIG. 1 so that the chuck shoulder 42 will bear down on the shoulder 52 of the working element 18 and thereby limit the rebound of the work element 18 in the casing 12. As previously explained, the larger the area of the surface 46 exposed to the front end portion 21 of hammer chamber 14, the less pressure of fluid in that front end portion 21 which must be present to reduce the rebound.

With the hammer 16 in the striking position as indicated in FIGURE 1, the hammer 16 closes off the exhaust port 34 during the striking phase of the operation thus enabling hammer 16 to compress the air in the front end portion 21 of the hammer chamber 14. Thereafter, air under pressure is conveyed to the front end portion 21, through passageway 28 when the hammer 16 is moved rearwardly.

In order to limit the longitudinal movement of the chuck 20 in the casing 12, the chuck 20 is provided with an outwardly flaring portion, such as a flange 54 on an outer periphery 56 of the chuck 20 itself and cooperates with an abutment 58 in the casing 12 thereby limiting the rearward movement of the chuck 20. Further, a cushioning means 60 limits the forward movement of the chuck 20 by engaging the forward shoulder 61 on the flange 54 of the chuck. Structurally, and in order to prevent wearing within the casing 12, a wearing sleeve 62 is press fitted into the casing 12 between abutment 58 and casing 12 to prevent the flange 54 from wearing against the casing 12. The cushioning means 60 is press fitted into the forward end 63 of the casing 12 and includes an outer hollow cylinder 64 and an inner hollow cylinder 66 with a cushion element 68 (such as a rubber sleeve) vulcanized to the cylinders 64 and 66 along their entire length. With this cushioning means 60, the shock of the blow from the chuck 20 striking the cushioning means 60 will greatly be reduced by the time it reaches the casing 12 because the shock is absorbed. This is important because when the chuck 20 is halted in its forward limiting position it delivers a blow on the cushioning means 60 which may be sufficient to crack the casing 12 if the entire shock is transmitted directly to the casing 12.

The force exerted by the chuck 20 on the cushioning means 60 may be due to the pressure force exerted on the rear chuck surface 46, which force moves the chuck 20 in the forward direction, or due to the hammer 16 striking the chuck 20 when the working element 18 is not in the chuck bore 40 or when it is not properly placed therein. There is no need for cushioning means 60 to limit the rearward movement of the chuck 20 because the shock or force of the blow transmitted to the tool abutment 58 by the chuck 20 is of no appreciable magnitude.

In operation, the reciprocating hammer 16 actuates the working element 18 so that it delivers rapid and repeated blows to the workpiece 38. During the repeated blows which the working element 18 delievers to the work piece 38, the working element 18 rebounds or bounds away from the work piece 38 thus causing vibration of the casing 12. In order to reduce these vibrations to a minimum in the casing 12, the pressure (in the front end portion 21 of hammer chamber 14) exerts a force on the chuck surface 46 sufficient in magnitude to move the chuck 20 into engagement with the working element 18 and to limit the rebound or bounce of the working element 18 away from the working piece 38.

It will be recognized by those skilled in the art that the objects of the present invention have been achieved. The improved chuck of the present invention is inexpensive and well constructed and provides a pneumatic tool which has a low vibration feature. The cushioning means 60 limits the movement of the chuck 20 in forward direction and keeps the improved chuck 20 in contact with the working element 18 so that the rebound of the working element 18, or the bounce that causes vibrations, is limited.

While in accordance with the patent statutes a preferred embodiment of the present invention has been illustrated and described in detail, it is to be particularly understood that the invention is not limited thereto or thereby.

I claim:
1. A pneumatic percussion tool comprising:
 (a) a tool casing containing a chamber;
 (b) a fluid actuated piston reciprocably mounted in said chamber;
 (c) a chuck slidably mounted in the front end of said casing in a manner providing for a limited amount of free axial movement, said chuck being provided with an axial bore for receiving a tool kit and having a forward-facing shoulder;
 (d) a tool bit slidably mounted in said axial bore in said chuck in a position to be repeatedly hammered by said piston;
 (e) said chuck having a rear end exposed to the fluid pressure in said chamber to urge said chuck forward away from said piston; and
 (f) cushioning means within said front end of said casing and normally spaced forwardly from said shoulder on said chuck a substantial distance when said chuck is at the rear end of its travel in said casing, said cushioning means being adapted to engage said shoulder to limit and stop the forward travel of said chuck and to absorb the shock of stopping said chuck to reduce the transmission of said shock to the tool casing.
2. The pneumatic tool of claim 1 wherein:
 (a) said tool casing includes a shoulder for engaging said chuck to limit its rearward movement in said casing.
3. The pneumatic tool of claim 1 wherein:
 (a) said tool bit includes a shoulder for engaging said chuck to limit its rearward movement in said chuck.
4. The pneumatic tool of claim 1 wherein:
 (a) said cushioning means includes a resilient sleeve mounted in the front end of said tool casing; and
 (b) said chuck is slidably mounted in said sleeve.

References Cited by the Examiner
UNITED STATES PATENTS

| | | | |
|---|---|---|---|
| 1,774,905 | 9/30 | Smrdel | 279—19.6 |
| 2,108,032 | 2/38 | Allen | 279—19 |
| 2,929,361 | 3/60 | Reynolds | 279—19.5 |
| 3,003,773 | 10/61 | Fuehrer | 279—19.6 |

ROBERT C. RIORDON, *Primary Examiner.*